US008344974B2

(12) United States Patent
Kim et al.

(10) Patent No.: US 8,344,974 B2
(45) Date of Patent: Jan. 1, 2013

(54) VOLTAGE DIVIDER FOR SUPPLYING A REDUCED VOLTAGE TO AN OLED DISPLAY DURING THE LIGHT EMISSION INTERVAL

(75) Inventors: Hak Su Kim, Seoul (KR); Kyoung Don Woo, Gumi-si (KR); Young Jun Hong, Gumi-si (KR)

(73) Assignee: LG Display Co. Ltd., Seoul (KR)

( * ) Notice: Subject to any disclaimer, the term of this patent is extended or adjusted under 35 U.S.C. 154(b) by 486 days.

(21) Appl. No.: 12/579,749

(22) Filed: Oct. 15, 2009

(65) Prior Publication Data

US 2010/0117937 A1 May 13, 2010

(30) Foreign Application Priority Data

Nov. 12, 2008 (KR) ........................ 10-2008-0112410

(51) Int. Cl.
*G06F 3/038* (2006.01)
*G09G 5/00* (2006.01)
*G09G 3/30* (2006.01)

(52) U.S. Cl. ......................................... 345/82; 345/211

(58) Field of Classification Search .............. 345/76-83, 345/211-213
See application file for complete search history.

(56) References Cited

U.S. PATENT DOCUMENTS

2001/0005193 A1* 6/2001 Yokoyama ...................... 345/92
2003/0043137 A1* 3/2003 Nakamura .................... 345/207
2003/0067424 A1* 4/2003 Akimoto et al. ................ 345/55
2003/0197663 A1* 10/2003 Lee et al. ........................ 345/76
2006/0109215 A1* 5/2006 Tanada et al. ................... 345/76
2007/0057934 A1* 3/2007 Jia et al. ........................ 345/211
2007/0229447 A1* 10/2007 Takahara et al. .............. 345/102
2007/0269168 A1* 11/2007 Park et al. ....................... 385/92

FOREIGN PATENT DOCUMENTS

CN 101191853 A 6/2008
CN 101196583 A 6/2008

OTHER PUBLICATIONS

Office Action issued in corresponding Chinese Patent Application No. 200910258499.5, mailed Feb. 23, 2012.

* cited by examiner

*Primary Examiner* — Chanh Nguyen
*Assistant Examiner* — Navin Lingaraju
(74) *Attorney, Agent, or Firm* — Brinks Hofer Gilson & Lione

(57) ABSTRACT

An OLED device is disclosed. The OLED device disposes a voltage divider and a switch unit in the output stage of a power supplier, thereby lowering the level of a supply voltage VDD, which is applied to a driver IC in an emission interval, below that of the supply voltage which is applied to the driver IC in a non-emission interval. Accordingly, the OLED device can reduce electric power consumption.

12 Claims, 3 Drawing Sheets

VOLTAGE DIVIDER FOR SUPPLYING A REDUCED VOLTAGE TO AN OLED DISPLAY DURING THE LIGHT EMISSION INTERVAL

This application claims the benefit of Korea Patent Application No. 10-2008-0112410 filed on Nov. 12, 2008, the entire contents of which is incorporated herein by reference for all purposes as if fully set forth herein.

BACKGROUND

1. Field of the Invention

This disclosure relates to an organic electro-luminescence display device adapted to reduce electric power consumption by lowering the level of a supply voltage VDD, which is applied to a driver IC (integrated circuit) in an emission interval, below that of the supply voltage which is applied to the driver IC in a non-emission interval.

2. Discussion of the Related Art

As the information society grows, display devices capable of displaying information have been widely developed. These display devices include liquid crystal display (LCD) devices, organic electro-luminescence display (OLED) devices, plasma display devices, and field emission display devices.

Among the above display devices, OLED devices are self-luminescent display devices which electrically excite a fluorescent organic-compound to emit light. Such OLED devices have several desirable features such as a low driving voltage, a thin size, and so on. Moreover, OLED devices have a wide viewing angle and a fast response time, both of which prevent the disadvantages found in LED devices. In view of these points, OLED devices have received a significant amount of attention as next-generation display devices.

An OLED device includes a plurality of pixels arranged in a matrix. Each of the pixels includes a switching transistor, a storage capacitor, a drive transistor, and an organic light emission diode (OLED).

A data voltage is applied to the drive transistor by a switching operation of the switching transistor. The drive transistor derives a driving electric current from the data voltage. The OLED emits light corresponding to the driving electric current. The storage capacitor maintains the data voltage during one frame period. The switching transistor and the drive transistor are elements which increase the quantity of electric current as the temperature rises. The OLED is an element which emits light in proportion to a quantity of electric current received.

The OLED device is divided into a panel displaying an image and a driving portion for driving the panel. The driving portion includes a gate driver for driving a plurality of gate lines arranged on the panel, and a data driver for driving a plurality of data lines arranged on the panel. The driving portion can further include a timing controller for controlling the timing of both the gate driver and the data driver. Also, the driving portion can include a power supplier which generates a supply voltage VDD using an input voltage applied from an external power supply unit. The supply voltage VDD is used to drive the gate driver, the data driver, and the timing controller.

The supply voltage VDD generated in the power supplier usually maintains a constant level regardless of whether the OLED device is in an emitting interval or a non-emitting interval. Due to this, the electric power consumption of the power supplier increases. Furthermore, the electric power consumption of the OLED device which includes this power supplier increases.

BRIEF SUMMARY

According to one aspect, an OLED device includes: a panel configured to include an electroluminescent element; a driver configured to drive the panel; a timing controller configured to control the timing of the driver; a power supplier configured to generate a supply voltage for driving the electroluminescent element and a main supply voltage for driving the driver, from an input voltage applied from an external power supply unit; and a voltage divider configured to respond to a voltage control signal applied from the timing controller and to vary the level of the main supply voltage applied from the power supplier to the driver according to emission and non-emission intervals of the luminescent element.

An OLED device according to another aspect embodiment includes: a panel configured to include an electroluminescent element; a driver configured to drive the panel; a timing controller configured to control the timing of the driver; a power supplier configured to generate a supply voltage for driving the electroluminescent element and a main supply voltage for driving the driver, from an input voltage applied from an external power supply unit; a switching element configured to be turned on in the non-emission interval of the electroluminescent element and turned off in the emission interval of the electroluminescent element, by the voltage control signal from the timing controller; and first to third resistors connected to differently divide the main supply voltage generated in the power supplier according to the turning on/off of the switching element so that the main supply voltage has a first voltage level in the non-emission interval of the electroluminescent element and a second voltage level lower than the first voltage level in the emission interval of the electroluminescent element. The first resistor includes one electrode connected to an output terminal of the power supplier and the other electrode connected to a first node between the second resistor and a feedback terminal of the power supplier. The second resistor includes one electrode connected to the first node and the other electrode connected to a second node to which the switching element and the third resistor are commonly connected. The third resistor includes one electrode connected to the second node and the other electrode connected to a ground source.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1:
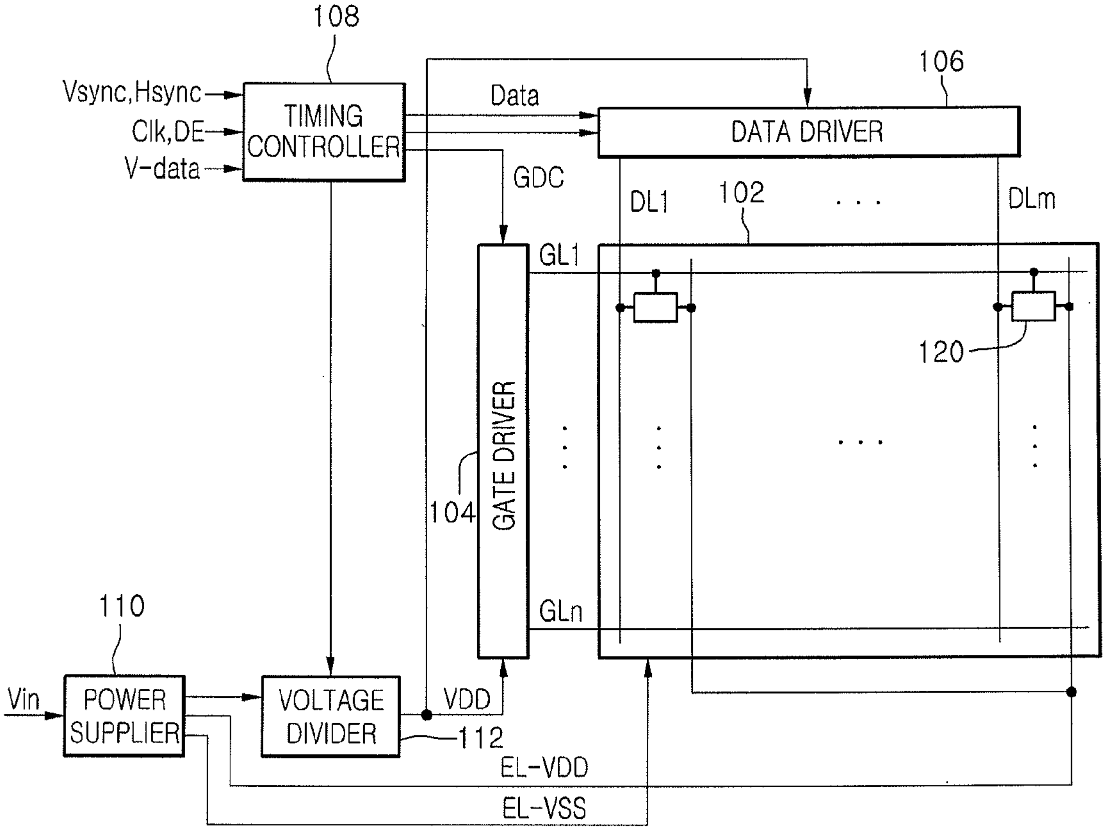
FIG. 1 is a schematic diagram showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a schematic diagram showing an LCD device according to an embodiment of the present disclosure. Referring to FIG. 1, an OLED device according to an embodiment of the present disclosure includes a panel 102 configured to include a plurality of gate lines GL1~GLn and a plurality of data lines DL1~DLm arranged to display an image, a gate driver 104 configured to apply scan signals to the plural gate lines GL1~GLn, a data driver 106 configured to apply data signals to the plural data lines DL1~DLm, and a timing controller 108 configured to control the timing of the gate driver 104 and the data driver 106.

The OLED device of the present embodiment further includes a power supplier 110 configured to generate a supply voltage VDD using an input voltage applied from an external power supply unit (not shown), and a voltage divider 112 configured to vary the level of the supply voltage VDD generated in the power supplier 110 according to emission or non-emission intervals. The supply voltage VDD is used to drive the gate driver 104 and the data driver 106.

Figure 2:
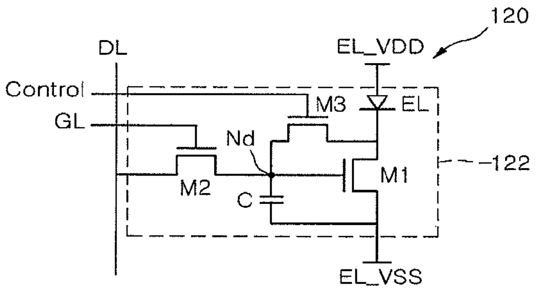
FIG. 2 is a circuit diagram showing in detail the pixel shown in FIG. 1.

The plural gate lines GL1~GLn and the plural data lines DL1~DLm arranged on the panel 102 cross each other perpendicularly and define pixels 120. Each of the pixels 120 includes an electroluminescent element EL and a pixel circuit 122 configured to control the electroluminescent element EL, as shown in FIG. 2. The pixels 120 are connected to supply lines to which first and second supply voltages EL_VDD and EL_VSS for the electroluminescent element EL are applied. The pixels 120 respond to the scan signals transferred through the respective gate lines and the data signals transferred through the respective data lines DL, thereby emitting lights.

The electroluminescent element EL of the pixel 120 includes an organic thin film (not shown) and first and second electrodes (not shown) formed on both sides of the organic thin film. The first electrode is formed of a metal material and is used as an anode electrode. The second electrode is formed of a transparent conductive material and is used as a cathode electrode. The second electrodes of the electroluminescent elements EL can be connected to one another.

The pixel circuit 122 includes first to third transistors M1~M3 and a capacitor C. Such components included in the pixel circuit 122 can be modified in a variety of manners.

The second transistor M2 includes a gate electrode connected to the respective gate line GL, a source electrode connected to the respective data line DL, and a drain electrode which, together with a first electrode of the capacitor C, a gate electrode of the first transistor M1, and a source electrode of the third transistor M3, is connected to a node Nd. Such a second transistor M2 responds to the scan signal applied from the respective gate line GL and samples the data signal applied from the respective data line DL.

The capacitor C includes the first electrode connected to the node Nd and a second electrode a second supply line transferring the second supply voltage EL_VSS for the electroluminescent EL. The capacitor C charges a voltage corresponding to the data signal transferred through the respective data line DL while the second transistor M2 is turned on (or activated). The capacitor C maintains a voltage difference between the gate and source electrodes of the first transistor M1 using its charged voltage.

The first transistor M1 includes the gate electrode connected to the node Nd, the source electrode commonly connected to the cathode electrode of the electroluminescent element EL and a drain electrode of the third transistor M3, and a drain electrode commonly connected to the second electrode of the capacitor C and the second supply line for transferring the second supply voltage EL_VSS for the electroluminescent element EL. The first transistor M1 functions as a source of electric current, applying an electric current to the electroluminescent element EL. In other words, the first transistor M1 controls the quantity of electric current flowing through the electroluminescent element EL by the charged voltage which is applied from the capacitor C to its gate electrode.

The third transistor M3 includes a gate electrode connected to a control line receiving a control signal “Control”, the source electrode connected to the node Nd, and the drain electrode commonly connected to the source electrode of the first transistor M1 and the cathode electrode of the electroluminescent element EL. The third transistor M3 is used for sensing (or detecting) the threshold voltage Vth of the first transistor M1. During the detection of the threshold voltage, the third transistor M3 is in a connection state such that the first transistor M1 functions as a diode.

The gate driver 104 generates the scan signal and sequentially applies the scan signal to the plural gate lines GL1~GLn. Accordingly, the pixels connected to the gate lines GL1~GLn are sequentially selected in one horizontal line.

The data driver 106 applies the data signals to the plural data lines DL1~DLm whenever the scan signal is applied to any one of the gate lines GL1~GLn, so that the data signals are transferred to the pixels on the respective horizontal line. The data driver 106 may be implemented in a current driving system. Alternatively, the data driver 106 can be configured in a number of different driving systems according to the pixel circuit 122.

The timing controller 108 receives synchronous signals Vsync and Hsync, a data enable signal DE, a clock signal CLK, and image data V-data from an external system (not shown) such as the graphic module of a computer system or the image demodulating module of a television receiver. The timing controller 108 generates gate control signals GCS and data control signals DCS using the synchronous signals Vsync ad Hsync, the data enable signal DE, and the clock signal CLK from the external system. The gate control signals are used to control the gate driver 104, and the data control signals are used to control the data driver 106. Also, the timing controller 108 rearranges the image data V-data from the external system into the data format required by the panel 102 and applies the rearranged data “Data” to the data driver 106.

The power supplier 110 generates the first and second supply voltages EL_VDD and EL_VSS for the electroluminescent element EL using an input voltage Vin applied from an external power supply unit (not shown). Also, the power supplier 110 generates a main supply voltage VDD which is used to drive driver ICs such as the gate driver 104, the data driver 106, and so on.

The timing of the voltage divider 112 is controlled by the timing controller 108, which changes the level of the main supply voltage VDD according to emission or non-emission intervals of the electroluminescent element EL. The level-changed main supply voltage is then applied to the gate driver 104 and the data driver 106.

Figure 3:
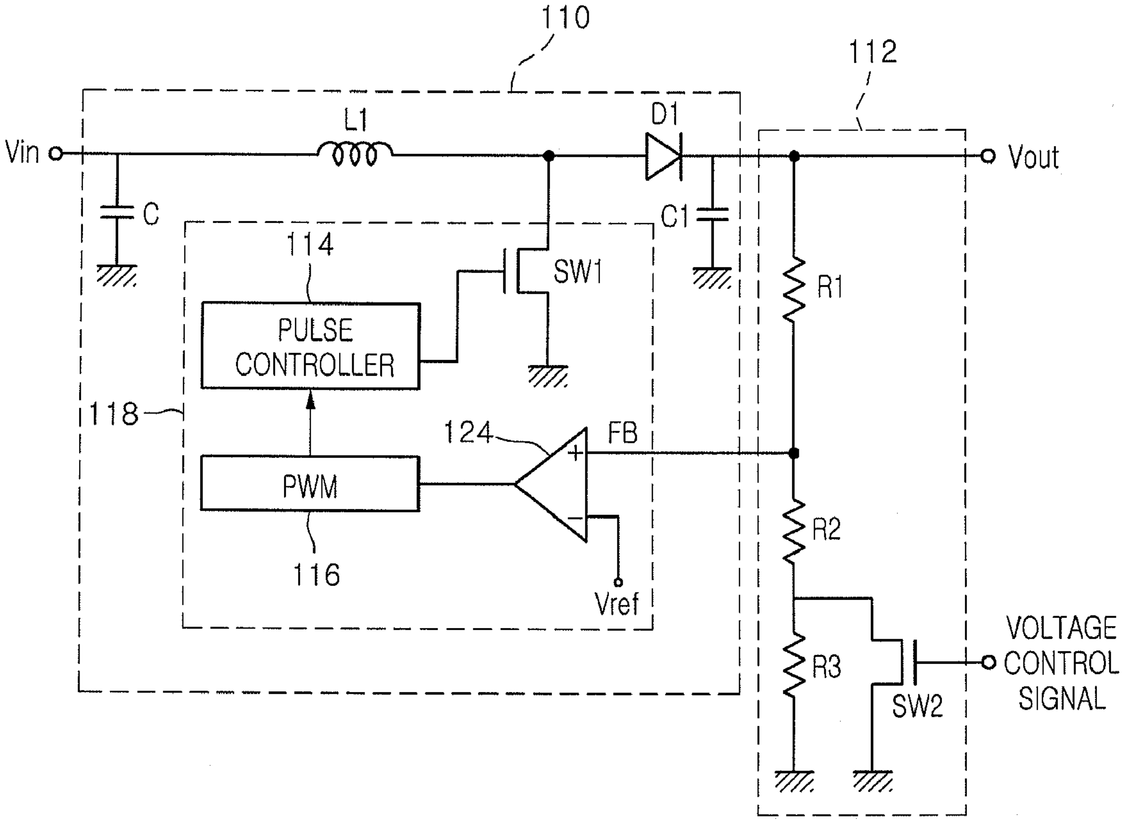
FIG. 3 is a circuit diagram showing in detail the power supplier and the voltage divider shown in FIG. 1.

FIG. 3 is a circuit diagram showing in detail the power supplier and the voltage divider shown in FIG. 1. As shown in FIGS. 1 and 3, the power supplier 110 includes: an inductor L1 configured to receive the input voltage Vin from the external power supply unit and to temporarily store an electric current corresponding to the input voltage Vin; an output controller 118 configured to form a current path together with the inductor L1 and to control the output period of a voltage corresponding to the stored electric current of the inductor L1; and a capacitor C1 configured to charge the voltage corresponding to the stored electric current of the inductor L1.

The power supplier 110, as described above, uses the input voltage Vin applied from the external power supply unit and generates the first and second supply voltages EL_VDD and EL_VSS, allowing the electroluminescent element EL to emit light, as well as the main supply voltage VDD. However, for the convenience of explanation, only part of the power supplier 110 (i.e., the circuit portion for generating the main supply voltage VDD to be applied to the driver ICs such as the gate driver 104 and data driver 106) will be described in the OLED device of the present embodiment.

The output controller 118 includes a pulse controller 114 configured to generate pulses of a fixed frequency, a pulse width modulator (PWM) 116 configured to modulate the width of the pulse to be generated in the pulse controller 114, and a first switching element SW1 alternately turned on and off according to the pulse which is generated in the pulse controller 114. Also, the output controller 118 can further include a comparator 124.

The pulse controller 114 generates pulses having a fixed frequency upon the control of the PWM 116 and applies these pulses to the first switching element SW1. The first switching element SW1 is turned on or off according to a high or low logic state of the pulse generated in the pulse controller 114.

When the first switching element SW1 is turned off, the current path of the inductor L1 of the power supplier 110 is broken with the output controller 118 and a current path is formed between the inductor L1 and the capacitor C1. As such, the capacitor C1 charges a voltage corresponding to the electric current stored in the inductor L1. In other words, an arbitrary voltage is charged in the capacitor when the first switching element SW1 is turned off. The voltage charged in the capacitor C1 is applied the voltage divider 112.

If the first switching element SW1 is turned on (activated), the inductor L1 is connected to the output controller 118 and forms a current path with the first switching element SW1 of the output controller 118. Accordingly, the electric current stored in the inductor is applied to the first switching element SW1 which has one electrode which is grounded to a ground source GND.

The voltage divider 112 is configured to include first to third resistors R1~R3 and a second switching element SW2. The first resistor R1 has the highest resistance among the resistors R1~R3. The second switching element SW2 responds to a voltage control signal generated in the timing controller 108 and is turned on or off. The second switching element SW2 is configured to include a NMOS transistor. In this case, the voltage control signal has a high logic value in the non-emission interval, when the electroluminescent element EL of FIG. 2 does not emit light. Also, the voltage control signal maintains a low logic value in the emission interval, i.e., when the electroluminescent element EL emits light.

The level of the voltage charged in the capacitor C1 varies between the activation/deactivation of the second switching element SW2, i.e., the connection configuration of the first to third resistors R1~R3 of the voltage divider 112.

If the voltage control signal generated in the timing controller 108 is high, i.e., in the case of the non-emission interval, the second switching element SW2 of the voltage divider 112 is turned on and allows the charged voltage of the capacitor C1 to be divided by the first and second resistors R1 and R2. The divided voltage is feedback to the power supplier 110 and forces an output voltage Vout (i.e., the main supply voltage VDD) to rise to a first main supply voltage VDD_1. The first main supply voltage VDD_1 is applied to the gate and data drivers 104 and 106 of FIG. 1 and allows the gate and data drivers to be driven in the non-emission interval of the electroluminescent element EL.

On the hand, when the voltage control signal generated in the timing controller 108 is low, i.e., in the case of the emission interval, the second switching element SW2 of the voltage divider 112 is turned off and allows the charged voltage of the capacitor C1 to be divided by the first to third resistors R1 to R3. The divided voltage is feedback to the power supplier 110 and forces the output voltage Vout (i.e., the main supply voltage VDD) to be lowered at a second main supply voltage VDD_2. The second main supply voltage VDD_2 is applied to the gate and data drivers 104 and 106 of FIG. 1 and allows the gate and data drivers to be driven in the emission interval of the electroluminescent element EL. The second main supply voltage VDD_2 has a level lower than that of the first main supply voltage VDD_1.

The first and second resistors R1 and R2 are connected in parallel to one input terminal of the comparator 124 of the output controller 118. As such, the comparator 124 receives the divided voltage from a node between the first and second resistors R1 and R2. The comparator 124 compares the divided voltage from the node between the first and second resistors R1 and R2 with a reference voltage Vref and applies a comparison signal in accordance with the compared resultant to the PWM 116. The PWM 116 determines whether or not to enable the pulse controller 114 to modulate the width of the pulse, according to the logic value (i.e., the high or low logic value) of the comparison signal.

The power supplier 110 can further include a filter C disposed in its input stage, because it receives the input voltage Vin from an external power supply unit. The filter C eliminates noise which may be included in the input voltage Vin. Also, the power supplier 110 can include a diode D1 connecting the inductor L1 and the capacitor C1. The diode D1 prevents the electric current stored in the inductor L1 from flowing in a reverse direction.

In this manner, an arbitrary voltage corresponding to the electric current stored in the inductor L1 is charged in the capacitor C1 upon the control of the output controller 118 and the charged voltage of the capacitor C1 is applied to the voltage divider 112. The voltage divider 112 uses the first to third resistors R1 to R3 and derives the first or second main supply voltage VDD_1 or VDD_2 from the charged voltage of the capacitor C1 in the non-emission or emission interval of the electroluminescent element EL. The voltage divider 112 applies the first or second main supply voltage VDD_1 or VDD_2 to the gate driver 104 and the data driver 106.

Figure 4:
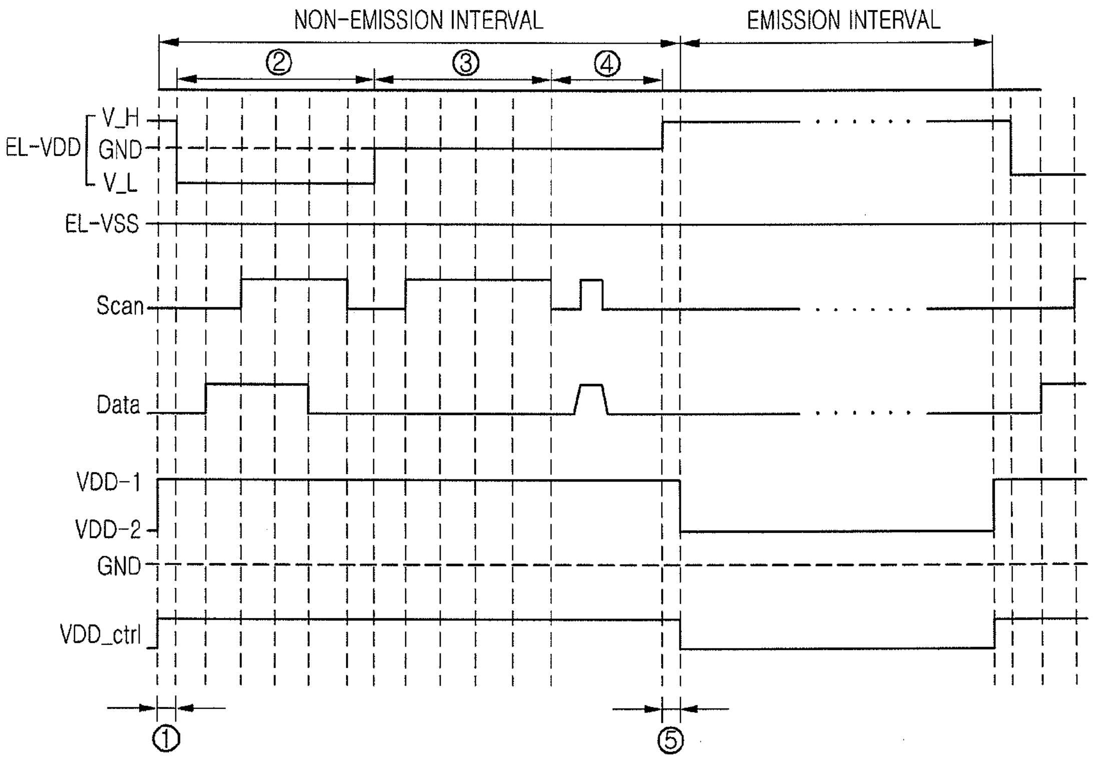
FIG. 4 is a timing chart explaining the driving timing of the OLED device shown in FIG. 1.

FIG. 4 is a timing chart explaining the driving timing of the OLED device shown in FIG. 1. As shown in FIGS. 1 and 4, the voltage control signal VDD_ctrl has a high logic in the non-emission interval of the electroluminescent element EL and has a low logic in the emission interval of the electroluminescent element EL. The non-emission interval is roughly divided into first to fifth sub-intervals ①~⑤.

The scan signal "Scan" and the data signal "Data" shown in the timing chart of FIG. 4 change according to the configuration of the pixel of FIG. 2. As such, the scan signal "Scan" and the data signal "Data" are not limited to the waveforms shown in FIG. 4.

The first sub-interval ① of the non-emission interval corresponds to the falling period of the first supply voltage EL_VDD which is generated in the power supplier 110 and used to drive the electroluminescent element EL. In other words, the first sub-interval ① of the non-emission interval can be designated as a period which enables the first supply voltage for the electroluminescent element EL to change from a high level to a low level. In the first sub-interval ① of the non-emission interval, the driver ICs, such as the gate and data drivers 104 and 106 shown in FIG. 1, may be set up.

The second sub-interval ② of the non-emission interval can be designated as a period which forces the voltage charged in the capacitor C of the pixel 120 shown in FIG. 2 to be reset. As such, the second sub-interval ② of the non-emission interval may correspond to the period during which the first supply voltage EL_VDD for the electroluminescent element EL maintains a low level.

In the third sub-interval ③ of the non-emission interval, the first supply voltage EL_VDD for the electroluminescent element EL is grounded and the scan signal "Scan" of a high logic is applied to the gate line GL shown in FIG. 1. In other words, the third sub-interval ③ of the non-emission interval can be designated as a period sensing the threshold voltage Vth of the first transistor M1 included the pixel 120 of FIG. 2.

In the fourth sub-interval ④ of the non-emission interval, the scan signal "Scan" maintaining a high logic during one horizontal period is applied to the gate line GL and the data signal "Data" is applied to the data line DL. At the same time, the first supply voltage EL_VDD for the electroluminescent element EL is still grounded. As such, the fourth sub-interval ④ of the non-emission interval can be designated as a period which charges the voltage of the data signal "Data" into the capacitor C of the pixel 120 shown in FIG. 2.

The first supply voltage EL_VDD for the electroluminescent element EL rises to a high level in the fifth sub-interval ⑤ of the non-emission interval. At the same time, the scan signal "Scan" of low logic is applied to the gate line GL, while no the data signal is applied to the data line DL.

On the other hand, the voltage control signal VDD_ctrl maintains the high logic in the first to fifth sub-intervals ①~⑤ of the non-emission interval. As such, the second switching element SW2 is turned on (or activated) and allows the first main supply voltage VDD_1 to be output from the voltage divider 112. Accordingly, the gate driver 104 and the data driver 106 receive the first main supply voltage VDD_1 output from the voltage divider 112 in the non-emission interval.

The fifth sub-interval ⑤ of the non-emission interval can be designated as a period discharging the voltage charged in the capacitor C1 of the power supplier 110. The fifth sub-interval ⑤ of the non-emission interval allows the power supplier 110 and the voltage divider 112 to have enough time to generate the second main supply voltage VDD_2 before the electroluminescent element EL changes from the non-emission interval to the emission interval.

The voltage control signal VDD_ctrl has the low logic in the emission interval. Then, the first supply voltage EL_VDD for the electroluminescent element EL has the high level and enables the electroluminescent element EL to emit light. Also, the voltage divider 112 outputs the second main supply voltage VDD_2 to be applied to the gate driver 104 and the data driver 106, in the emission interval.

The second main supply voltage VDD_2 has a level lower than the first main supply voltage VDD_1. In other words, the second main supply voltage VDD_2 is lower than the first main supply voltage VDD_1 and higher than the logic voltage (for example, Vcc of 2.8V) of the driver ICs such as the gate and data drivers 104 and 106. Consequently, the second main supply voltage VDD_2 can be established at a minimized level, which allows the driver ICs such as the gate and data driver 104 and 106 to maintain their operating state, at a little more than the minimized level.

In this way, the first main supply voltage VDD_1 is applied to the driver ICs such as the gate and data drivers 104 and 106 in the non-emission interval of the electroluminescent element EL, while the second main supply voltage VDD_2 is applied to the driver ICs in the emission interval of the electroluminescent element EL. As such, the gate and data drivers 104 and 106 are normally driven by the first main supply voltage VDD_1 in the non-emission interval. Meanwhile, in the emission interval, the gate and data drivers 104 and 106 only maintain their operating state by the second main supply voltage VDD_2 which is lower than the first main supply voltage VDD_1 in voltage level.

As described above, the OLED device according to an embodiment of the present disclosure allows the driver ICs such as the gate and data drivers 104 and 106 to be driven by the second main supply voltage VDD_2 having a level lower than that of the first main supply voltage VDD_1, in the emission interval of the electroluminescent element EL. Accordingly, the OLED device can greatly reduce electric power consumption in comparison with the related art OLED device which allows the driver ICs to be driven by the first main supply voltage VDD_1 regardless of the emission and non-emission intervals.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. An organic electro-luminescence display device comprising:

a panel configured to include an electroluminescent element;

a driver configured to drive the panel;

a timing controller configured to control the timing of the driver;

a power supplier configured to generate a supply voltage that drives the electroluminescent element and a main supply voltage that drives the driver, from an input voltage applied from an external power supply unit; and a voltage divider configured to respond to a voltage control signal applied from the timing controller and to vary the level of the main supply voltage applied from the power supplier to the driver according to emission and non-emission intervals of the luminescent element, wherein the voltage divider includes;

a switching element configured to be turned on by the voltage control signal from the timing controller in the non-emission interval of the electroluminescent element and turned off in the emission interval of the electroluminescent element; and first to third resistors connected to differently divide the main supply voltage generated in the power supplier according to the turning on/off of the switching element so that the main supply voltage has a first voltage level in the non-emission interval of the electroluminescent element and a second voltage level lower than the first voltage level in the emission interval of the electroluminescent element, wherein the first resistor includes one electrode connected to an output terminal of the power supplier and the other electrode connected to a first node between the second resistor and a feedback terminal of the power supplier; the second resistor includes one electrode connected to the first node and the other electrode connected to a second node to which the switching element and the third resistor are commonly connected; and the third resistor includes one electrode connected to the second node and the other electrode connected to a ground source.

2. The organic electro-luminescence display device claimed as claim 1, wherein the voltage divider divides the main supply voltage applied from the power supplier by the first and second resistors among the first to third resistors and allows the main supply voltage of the first voltage level to be applied to the driver, when the switching element is turned on.

3. The organic electro-luminescence display device claimed as claim 1, wherein the voltage divider divides the main supply voltage applied from the power supplier by the first to third resistors and allows the main supply voltage of the second voltage level to be applied to the driver, when the switching element is turned off.

4. The organic electro-luminescence display device claimed as claim 1, wherein the switching element includes an NMOS transistor.

5. The organic electro-luminescence display device claimed as claim 1, wherein the first resistor has the largest resistance among the first to third resistors.

6. The organic electro-luminescence display device claimed as claim 1, wherein the level of the main supply voltage, which is applied to the driver in the emission interval, is lower than that of the main supply voltage which is applied to the driver in the non-emission interval.

7. An organic electro-luminescence display device comprising:

a panel configured to include an electroluminescent element;

a driver configured to drive the panel;

a timing controller configured to control the timing of the driver;

a power supplier configured to generate a supply voltage for driving the electroluminescent element and a main supply voltage for driving the driver, from an input voltage applied from an external power supply unit;

a switching element configured to be turned on in the non-emission interval of the electroluminescent element and turned off in the emission interval of the electroluminescent element, by a voltage control signal from the timing controller; and first to third resistors connected to differently divide the main supply voltage generated in the power supplier according to the turning on/off of the switching element so that the main supply voltage has a first voltage level in the non-emission interval of the electroluminescent element and a second voltage level lower than the first voltage level in the emission interval of the electroluminescent element, wherein the first resistor includes one electrode connected to an output terminal of the power supplier and the other electrode connected to a first node between the second resistor and a feedback terminal of the power supplier; the second resistance includes one electrode connected to the first node and the other electrode connected to a second node to which the switching element and the third resistor are commonly connected; and the third resistor includes one electrode connected to the second node and the other electrode connected to a ground source.

8. The organic electro-luminescence display device claimed as claim 7, wherein the level of the main supply voltage, which is applied to the driver in the emission interval, is lower than that of the main supply voltage which is applied to the driver in the non-emission interval.

9. The organic electro-luminescence display device claimed as claim 7, wherein a voltage divider divides the main supply voltage applied from the power supplier by the first and second resistors among the first to third resistors and allows the main supply voltage of the first voltage level to be applied to the driver, when the switching element is turned on.

10. The organic electro-luminescence display device claimed as claim 7, wherein the voltage divider divides the main supply voltage applied from the power supplier by the first to third resistors and allows the main supply voltage of the second voltage level to be applied to the driver, when the switching element is turned off.

11. The organic electro-luminescence display device claimed as claim 7, wherein the switching element includes an NMOS transistor.

12. The organic electro-luminescence display device claimed as claim 7, wherein the first resistor has the largest resistance among the first to third resistors.

* * * * *